2,697,044
Patented Dec. 14, 1954

2,697,044

FILM CEMENT

Robert S. Battey, Rochester, N. Y., assignor to Eastman Kodak Company, Rochester, N. Y., a corporation of New Jersey No Drawing. Application May 14, 1953,
Serial No. 355,180

3 Claims. (Cl. 106—176)

This invention relates to a cement, particularly to a film cement adapted for cementing photographic film.

Known adhesives used for cementing films used in photography require unusual adaptability properties. For instance, it is well-known that motion picture films may be made of such materials as nitrocellulose, cellulose acetate, mixed esters of cellulose and the like. A suitable film cement should work equally well with such varying types of film base. In addition the cement should have a fast initial attack and should hold well during the early setting time. It should also have good holding power over the lift of the film. Since film cements are very often used with mechanical film splicing aids, it is desirable that no residue or gum be left on the film splicing mechanism which might smear the splices or dirty the splicers. It is also desirable that the resulting splice be clean and free from deposits which would further smear the film or projecting equipment.

An object of this invention is to provide a film cement which can be used with a variety of types of film base and which has a fast attack and good initial holding power. Another object of this invention is to provide a film cement which leaves very little residue and provides a clean, clear splice. A further object of this invention is to provide a film cement having good holding qualities over a long period of time. Another object is to provide a film cement which can be used safely without hazard to the health of users.

I have found that a critical combination of particular solvents having a small amount of nitrocellulose dissolved therein will accomplish the above objects of this invention. The preferred embodiment of this invention is as follows, the proportions being by weight:

| | Percent |
|---|---|
| Acetone | 20.5 |
| Dioxane | 19.0 |
| Methylene chloride | 55.0 |
| Methyl alcohol | 3.7 |
| Nitrocellulose | 1.5 |
| Ethyl alcohol | 0.3 |
| | 100.0 |

Flash point:
  Open cup _____ 35–36° F.
  Closed cup _____ 28–30° F.

Splices made with the above formula have been found to have adequate strength for usual handling after 4 seconds. Evaporated samples were tested to determine what change in properties occurred during room temperature evaporation. Splice tests showed no change in speed of attaining initial strength or in ultimate strength after evaporation of up to 25% by volume. Flash-point determinations showed a slight decrease with evaporation, and a final value after 50% evaporation of 31% F.

I have also found that certain variations in the composition are permissible without damaging the characteristics of this cement. The critical limits are as follows: Methylene chloride must be present to the extent of at least 45% of the total, if a flash point above 20° is desired due to safety requirements. When the flash point is not considered critical, the methylene chloride may be reduced further without sacrifice of early strength. However, it should not be any lower than about 35%.

Methyl alcohol should be present to the extent of about ⅒ of the methylene chloride. Similar acting lower alkyl alcohols such as ethyl alcohol may be substituted in the same proportion. Dioxane should not be reduced below about 20% of the total. Acetone concentration should be at least about 10% of the total. Cellulose nitrate should be above about 1.0% by weight. A trace of water may be present, but the cement should be essentially anhydrous.

I claim:

1. A film cement comprising approximately 20.5% acetone, 19% dioxane, 55% methylene chloride, 3.7% methyl alcohol and 1.5% nitrocellulose by weight.

2. A film cement comprising at least 10% acetone, at least 45% methylene chloride, at least 20% dioxane, at least 5% methyl alcohol, and at least 1% cellulose nitrate by weight.

3. A film cement comprising at least 10% acetone, at least 35% methylene chloride, at least 19% dioxane, at least 3% methyl alcohol, and at least 1% cellulose nitrate.

References Cited in the file of this patent

UNITED STATES PATENTS

| Number | Name | Date |
|---|---|---|
| 2,203,705 | Stahly et al. | June 11, 1940 |

FOREIGN PATENTS

| Number | Country | Date |
|---|---|---|
| 458,088 | Canada | July 12, 1949 |
| 653,025 | France | Mar. 15, 1929 |

OTHER REFERENCES

Simonds et al., "Handbook of Plastics" (1943), pages 246 and 7.